July 1, 1924.

R. E. BAKER ET AL 1,499,799

CONVEYER FOR PLASTIC BODIES

Filed Sept. 21, 1920       7 Sheets-Sheet 1

INVENTORS
Robert E. Baker and
BY   Laurence S. Harber

John Lofka
ATTORNEY.

INVENTORS
Robert E. Baker and
Laurence S. Harber
BY John Lotka
ATTORNEY.

July 1, 1924.
R. E. BAKER ET AL
CONVEYER FOR PLASTIC BODIES
Filed Sept. 21, 1920
1,499,799
7 Sheets-Sheet 5
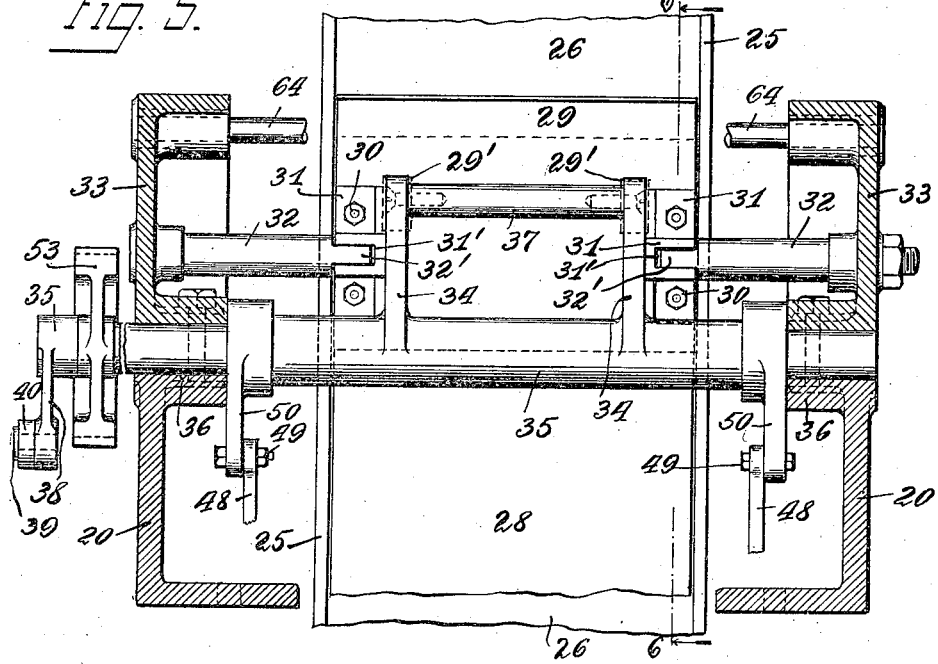
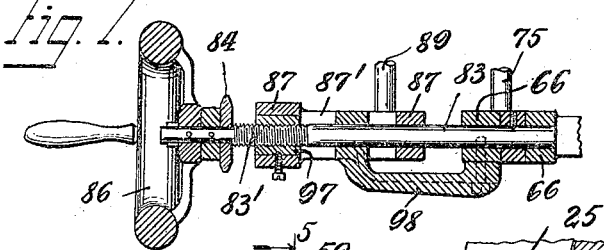
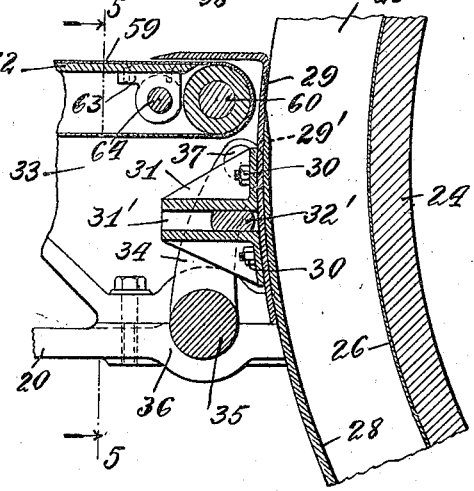
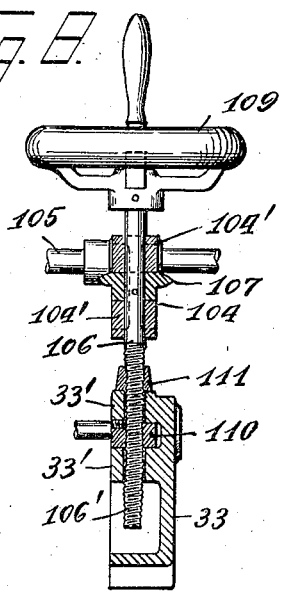
INVENTORS
Robert E. Baker and
BY  Laurence S. Harber
John Lotka
ATTORNEY.

July 1, 1924.
R. E. BAKER ET AL
1,499,799
CONVEYER FOR PLASTIC BODIES
Filed Sept. 21, 1920       7 Sheets-Sheet 6
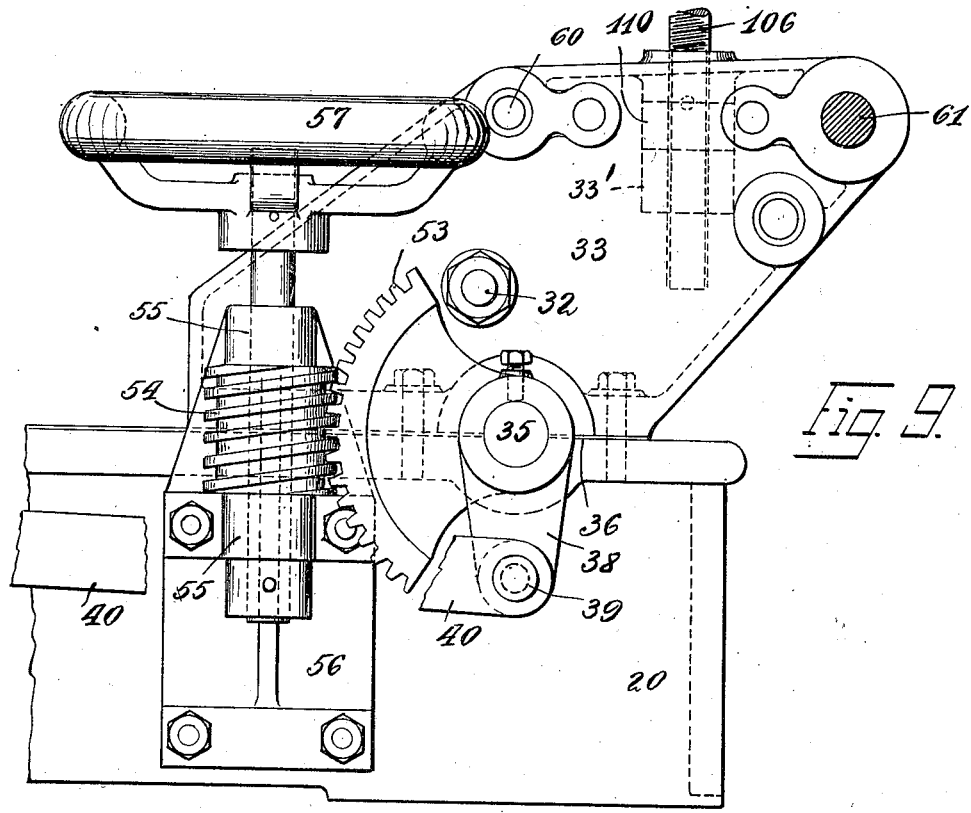
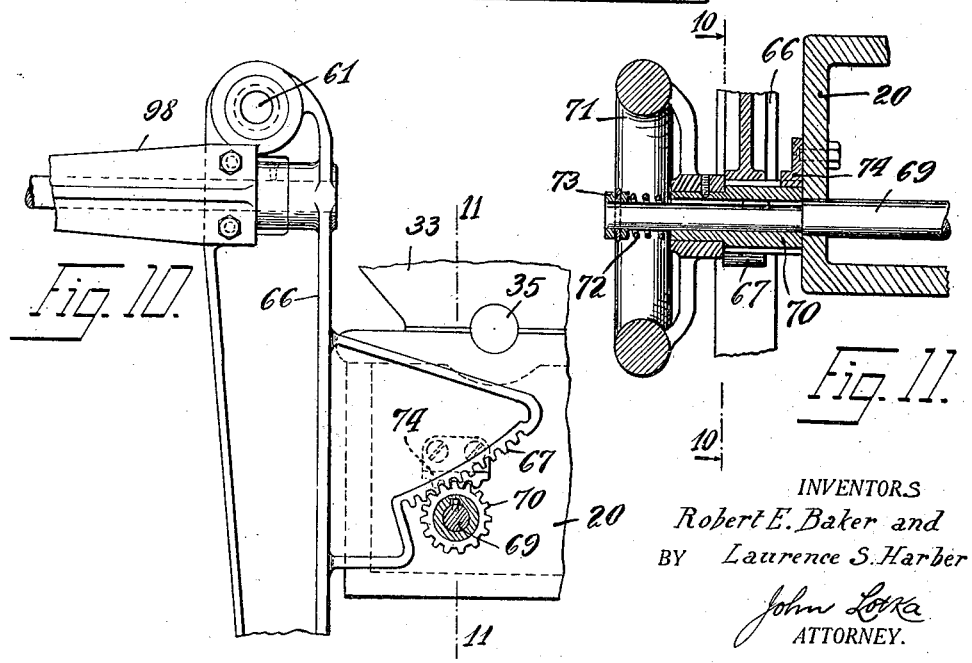
INVENTORS
Robert E. Baker and
BY Laurence S. Harber
John Lotka
ATTORNEY.

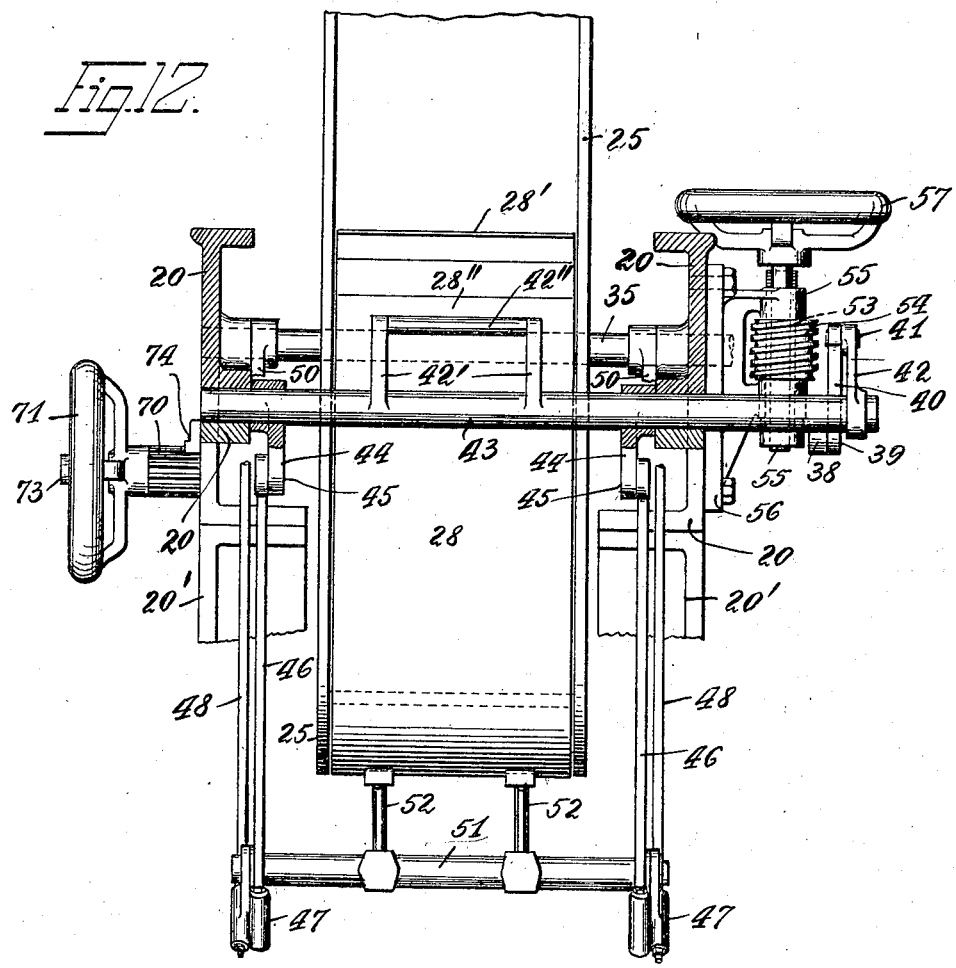
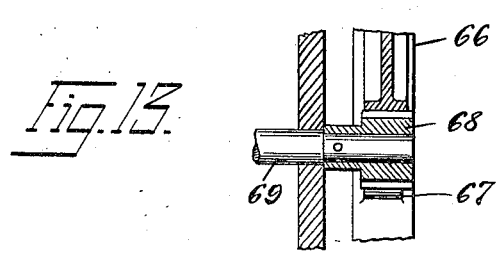

Patented July 1, 1924.

1,499,799

UNITED STATES PATENT OFFICE.

ROBERT ELMER BAKER, OF BRONXVILLE, AND LAURENCE SEYMOUR HARBER, OF KATONAH, NEW YORK, ASSIGNORS TO JOSEPH BAKER SONS & PERKINS COMPANY, INC., OF WHITE PLAINS, NEW YORK, A CORPORATION OF NEW YORK.

CONVEYER FOR PLASTIC BODIES.

Application filed September 21, 1920. Serial No. 411,749.

*To all whom it may concern:*

Be it known that we, ROBERT ELMER BAKER, a resident of Bronxville, in the county of Westchester and State of New York, and LAURENCE SEYMOUR HARBER, a resident of Katonah, in the county of Westchester and State of New York, both subjects of the King of Great Britain, have invented certain new and useful Improvements in Conveyers for Plastic Bodies, of which the following is a specification.

This invention relates to conveyers for plastic bodies and has been designed particularly for carrying lumps or balls of dough in connection with machinery such as is employed in large bakeries. In the specific example of our invention illustrated in the accompanying drawings and fully described with reference thereto, the masses of dough, preferably rolled into substantially cylindrical shape by means of apparatus such as the well-known Thompson molder, are fed first between a revolving drum and a non-revolving pressure-plate arranged adjacent to a portion of the periphery of said drum; then the masses of dough are carried away from said drum between the parallel and approximately horizontal runs of two co-operating endless conveyers, which in turn deliver the dough rolls to another pair of conveyers, these latter being arranged to feed said dough portions or rolls downwardly between parallel upright runs, and to deliver the said dough rolls to another part of the apparatus, say to pans connected to a further conveyer, for delivering the dough masses to another part of the baking plant, say to the so-called "final proofer." The invention also comprises various devices for the individual adjustment of certain of its parts, whereby the operation may be regulated to produce the exact results desired.

Figure 1:
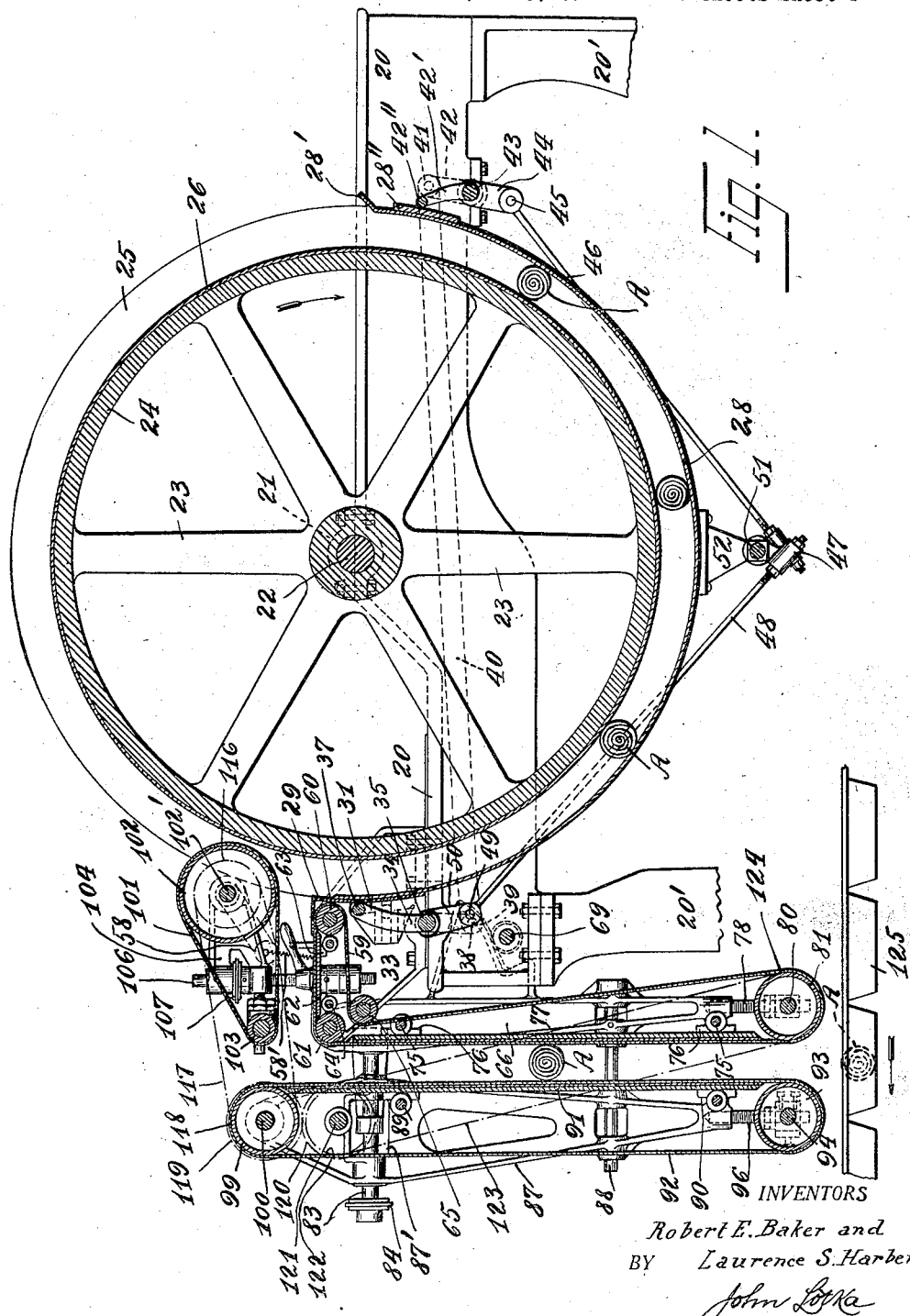
Figure 2:
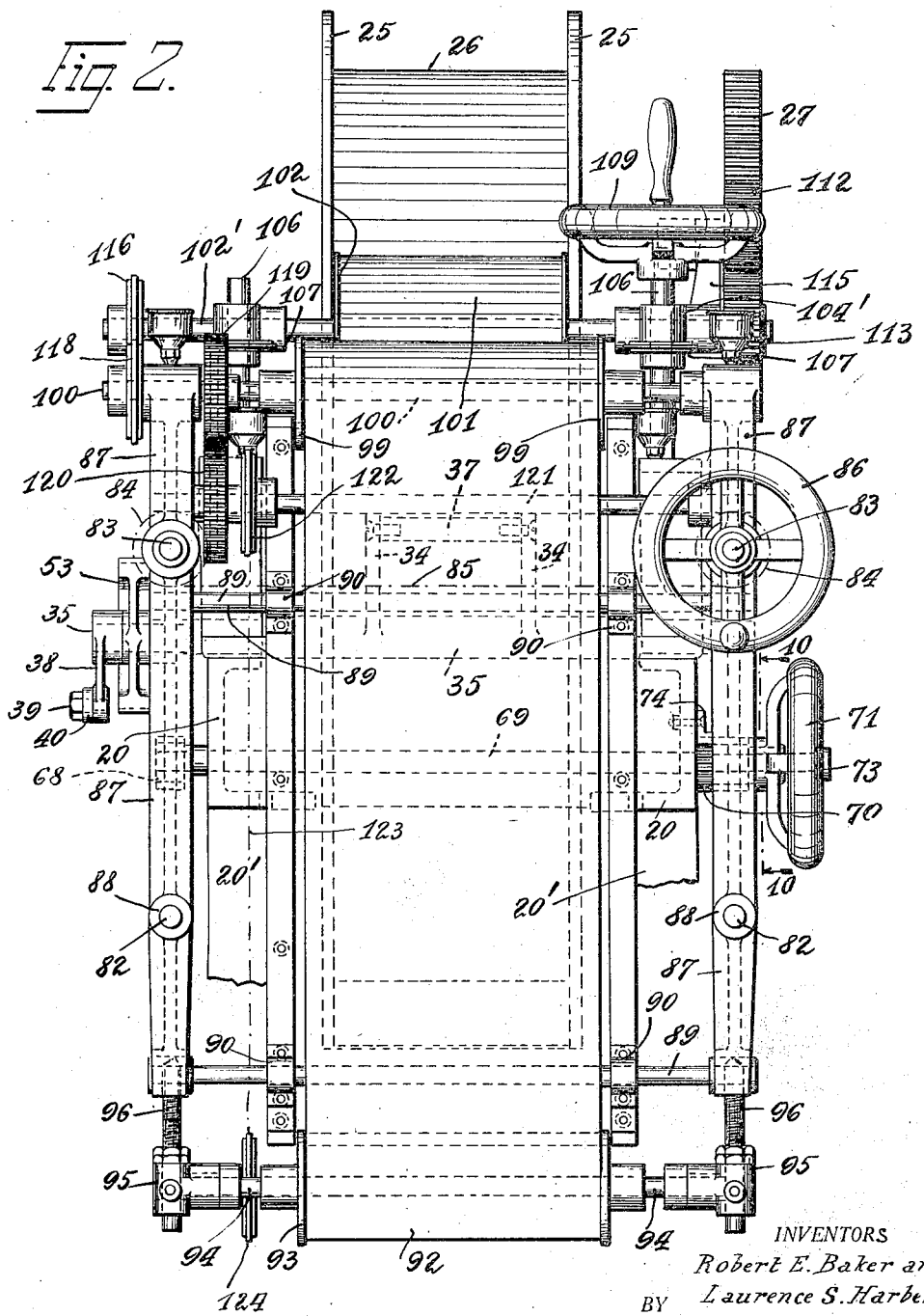
Figure 3:
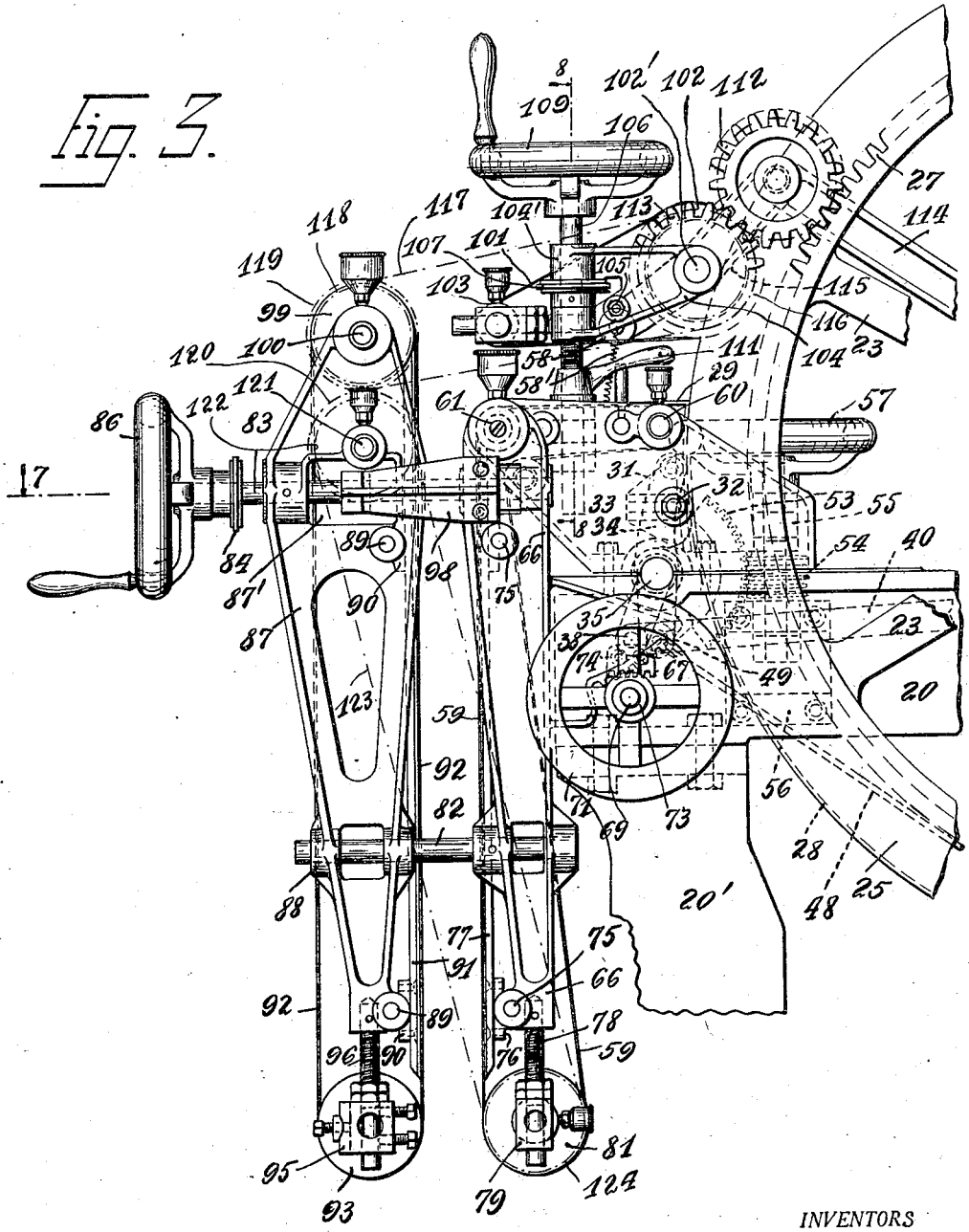
Figure 4:
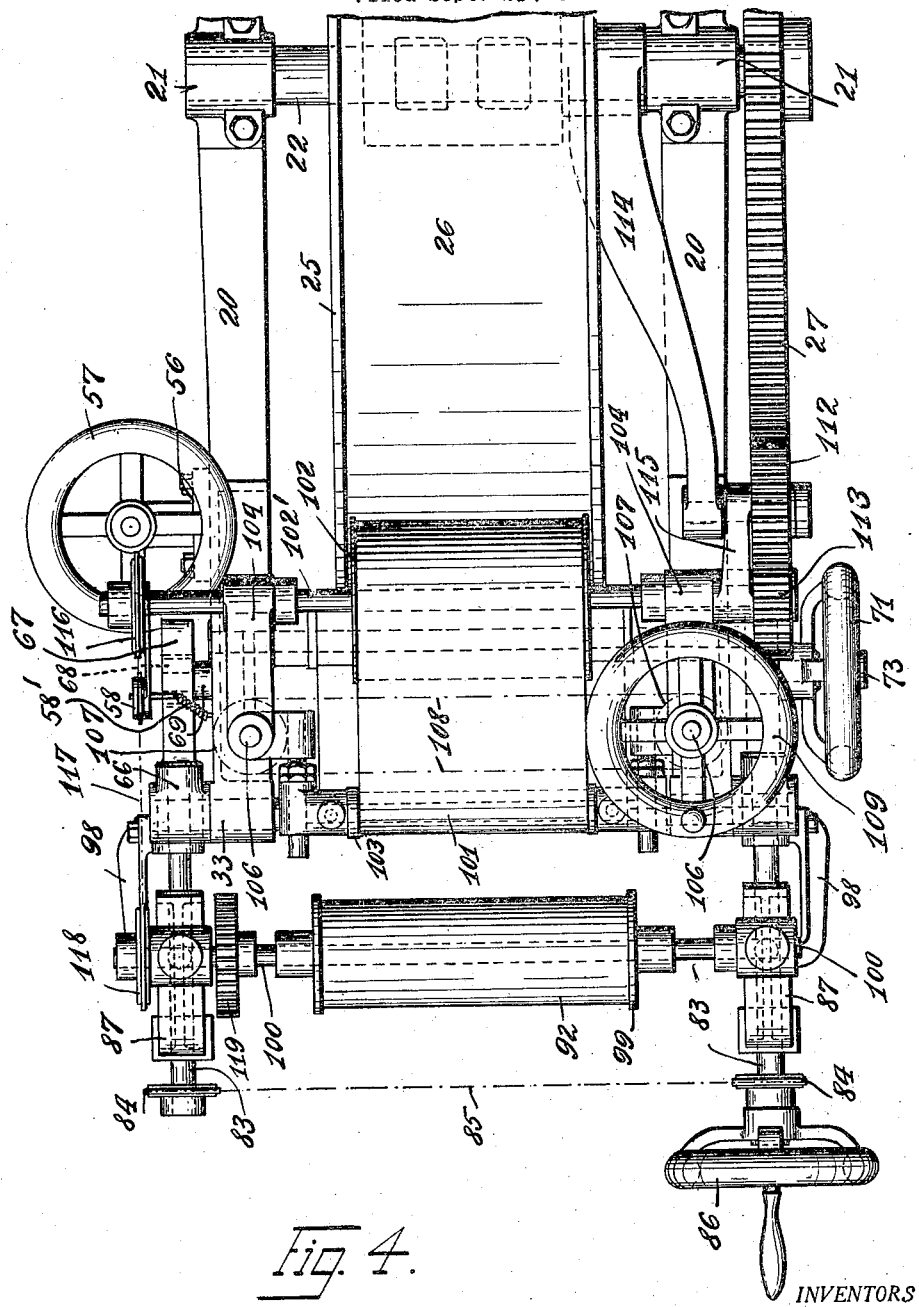

In the accompanying drawings Fig. 1 is a vertical section of the apparatus, taken through the center of Fig. 2, which latter is an end elevation, looking from the left-hand end of Fig. 1, drawn upon an enlarged scale; Fig. 3 is a partial side elevation, looking from the right-hand end of Fig. 2; Fig. 4 is a partial plan of the machine, showing somewhat more than the parts appearing in Fig. 3; Fig. 5 is a detail transverse vertical section, substantially on the line 5—5 of Fig. 6, the latter being a longitudinal vertical section, substantially on the line 6—6 of Fig. 5; Fig. 7 is a detail horizontal section of certain parts, at the level indicated by the line 7 in Fig. 3; Fig. 8 is a vertical section on the line 8—8 of Fig. 3; Fig. 9 is an elevation of certain parts at the upper portion of the machine, looking in the direction opposite to that in which Fig. 3 is taken; Fig. 10 is a vertical section on the lines 10—10 of Figs. 2 and 11, the latter being a vertical section on the line 11—11 of Fig. 10; Fig. 12 is an end elevation of the machine, looking from the end at which the dough is supplied to the machine, and showing some parts in section; and Fig. 13 is a vertical section taken in the same plane as Fig. 11, but showing the parts at the opposite end of the shaft 69.

The general arrangement of the parts constituting our improved mechanism or machine will be understood best from Fig. 1. A suitable frame 20, supported on legs or standards 20' carries suitable bearings 21 (see also Fig. 4) in which is journaled the main shaft 22 rotatable about a horizontal axis and carrying rigidly a drum structure comprising spokes 23, a cylindrical rim 24 with flanges 25 extending outwardly at each side thereof (see also Fig. 2), and a suitable cover 26, say of canvas, surrounding said rim between the flanges 25. To the shaft 22 is also secured rigidly a large gear wheel 27 (Figs. 3 and 4), and this gear wheel, besides driving certain mechanisms as specified hereinafter, may also serve to receive power for rotating the shaft 22 continuously in the direction indicated by the arrows, say by means of a motor (not shown) provided with a driving pinion (not shown) in mesh with said gear wheel 27.

At the lower portion of the machine, the drum is partly surrounded, say for about one-half of its periphery, by a pressure plate 28 of generally semi-cylindrical shape made of sheet-metal or other somewhat yielding and elastic material, and of a width to fit between the flanges 25 (Fig. 5). At the receiving end of the machine, this pressure-plate is preferably provided with a lip 28' inclined outwardly to form a funnel-shaped or gradually-contracted entrance to the annular space intervening between the pressure-plate and the adjacent portion of the cover 26 on the drum rim 24. At the opposite or exit end of said space, the pressure-plate overlaps, in the manner shown in Figs. 1, 5, and 6, a bridging member 29 having a downwardly extending portion curved to conform to said pressure-plate 28, and a horizontal upper portion, this bridging member therefore being, in cross section, substantially of inverted L-shape. To the curved depending portion of this bridging member is secured, as by screws and nuts 30, an outwardly-extending bracket 31, adjacent to each of the side edges of said member. Each of these brackets is provided with a guideway 31', the upper and lower walls of which are in guiding engagement with the flattened end portions 32' of aligning spaced stationary guide pins 32 secured rigidly to a housing 33 which is secured rigidly to the frame 20, near one end thereof. Thus the bridging member 29 is compelled to move in a path parallel to the flat faces of the ends 32', which are shown horizontal and parallel to the flat upper portion of the bridging member. At two points located between the brackets 31, and adjacent thereto, the bridging member 29 is provided with two upright or circumferential slots 29' (Fig. 5) through which project the upper ends of arms 34 secured rigidly to a rock-shaft 35 journaled in bearings 36 located at the junction of the frame 20 with the housing 33. Through the openings or slots 29' the upper ends of the arms 34 are in engagement with the outer surface of the pressure-plate 28, which surface has a sliding engagement with the inner face of the depending portion of the bridging member 29. The two arms 34 fit between the brackets 31, and thus assist in preventing lateral motion of the bridging member, since the shaft 35 is held against movement lengthwise of its axis. The arms 34 are connected by a horizontal rod 37 parallel to the shaft 35 and bearing on the bridging member 29 between the slots 29' to press said member inwardly, or toward the drum, the outward spring or elasticity of the pressure-plate 28 maintaining it and the bridging member 29 in contact with the arms 34 and rod 37 respectively.

To the rock shaft 35 is also secured rigidly a crank arm 38 (Figs. 1 and 9) having its lower end connected pivotally, at 39, with a forwardly-extending rod 40 projecting beyond the shaft 22 and having its forward end connected pivotally, at 41, with a crank arm 42 extending upwardly from a rock shaft 43. The latter has upwardly-extending arms 42', connected by a rod 42", corresponding to the arms 34 and rod 37, and engaging a strengthening piece 28" secured to the pressure-plate 28. Shaft 43 is further provided with downwardly-extending crank arms 44 connected pivotally at 45 with inclined operating rods 46 the lower ends of which are secured (preferably so as to permit longitudinal adjustment) to connecting blocks 47 located below the bottom portion of the pressure-plate 28. Similar rods 48, inclined in the opposite direction, have their lower ends secured in like manner to the respective blocks 47, while their upper ends are connected pivotally at 49 with crank arms 50 projecting downwardly from the shaft 35. The blocks 47 have upwardly-extending lugs for pivotally connecting them, by means of a cross rod 51 extending under the pressure-plate 28, with brackets 52 secured rigidly to the bottom portion of said plate. The axes of the connections 39, 41, 45, and 49 are horizontal and parallel to the shafts 22, 35, and 43.

On the shaft 35 is further secured rigidly a toothed sector 53 (Fig. 9) in mesh with a worm 54 mounted to turn about a vertical axis in bearings 55 carried by a bracket 56 secured to the frame 20. A hand-wheel 57 carried by the upper end of the worm shaft enables the worm to be turned for the purpose of swinging the shaft 35 and thereby adjusting the pressure-plate 28 up or down, with a corresponding adjustment of the bridging member 29 outwardly or inwardly, as will be explained in detail when describing the operation of the machine.

The free or outer end of the horizontal upper portion of the bridging member 29 extends over one end of the horizontal upper run of an endless conveyer 59, said upper run being supported by rollers 60 and 61 journaled in the housing 33, and in order to keep this upper run perfectly flat and keep it from sagging, it is engaged by a stationary supporting plate 62 attached to brackets 63 carried by rods 64 secured to said housing 33. The lower run of the conveyer 59 passes from the roller 60 to another roller 65 likewise journaled in the housing 33. The remaining portion of the conveyer 59 extends downwardly, and is adjustable to different positions. For this purpose, we provide a frame 66, suspended to swing about the horizontal axis of the roller 61, and said swinging frame consists of two rigidly connected sections located at each side of the stationary frame, and each carrying a toothed sector 67 (Figs. 4, 10, 11 and 13) the center of which is on the axis about which the frame 66 swings. One of these sectors 67 meshes with a pinion 68 secured rigidly to a horizontal shaft 69 mounted to turn in the frame 20 about an axis parallel to that of the roller 61, but held against longitudinal motion. The other sector 67, at the opposite side of the frame 20, engages at all times a pinion 70, held to turn with the shaft 69, but capable of sliding thereon lengthwise. The teeth of this pinion are of greater length than those of the pinion 68, so that notwithstanding the longitudinal movement of the pinion 70 it may always remain in engagement with the corresponding sector 67. With the pinion 70 is connected rigidly a hand-wheel 71, and the hand-wheel, together with the pinion, is pressed toward the frame 20 by a coiled spring 72 surrounding the shaft 69 and bearing against a collar 73 at the end of said shaft. Normally, under the influence of said spring, the pinion 70 will be held in mesh with a stationary rack portion 74, secured to the frame 20, so that rotation of the pinion and of the shaft 69 will be prevented, thus locking the frame 66 against accidental movement. The hand-wheel 71 may however be pulled outwardly to carry the pinion 70 out of engagement with the locking rack portion 74, thus freeing said pinion for rotation, to enable the frame 66 to be adjusted to different positions by turning the said hand-wheel 71.

The two members of the swinging frame may be connected rigidly by transverse rods 75 (Figs. 1 and 3), corresponding to the rods 64, and carrying brackets 76 to which is secured a plate 77 forming a support or backing for one of the upright runs of the conveyer 59. From the lower portions of the members of the frame 66 two rods 78, secured thereto rigidly, project downwardly, and on these rods are adjustable up and down slides 79 in which is journaled the shaft 80 of a bottom roller 81, engaged by the conveyer 59. To the members of the frame 66 are further secured rigidly two horizontal rods 82 parallel with the upper run of the conveyer 59. At their upper portions, these members of the frame 66 carry two horizontal shafts 83, parallel to the rods 82, said shafts being mounted to turn in the frame 66, but held against longitudinal movement. Each of said shafts carries a sprocket wheel 84, and the two sprocket wheels are connected by a chain 85 (Fig. 4), compelling both shafts 83 to rotate in unison. On one of these shafts is secured rigidly a hand-wheel 86 for operating the adjusting mechanism controlled by said shafts. Movable longitudinally of the rods 82 and of the shafts 83, and therefore at right angles to that run of the conveyer 59 which is engaged by the backing plate 77, is a frame 87, similar in a general way to the frame 66, that is, it consists of two rigidly connected members located at opposite sides of the machine frame 20. Each of these members is provided with sleeves 88 sliding on the respective rod 82, the rigid connection of the two members being effected by transverse rods 89 to which are secured brackets 90 carrying a plate 91 which forms a backing for one of the upright runs of an endless conveyer 92. This conveyer run is parallel to the adjacent run of the conveyer 59, that is to say, the plates 77 and 91 are parallel to each other. The lower end of the conveyer 92 passes around a pulley or roller 93, the shaft 94 of which is journaled in slides 95 (Fig. 2) adjustable up and down on rods 96 secured rigidly to the lower portion of the frame 87. The slides 95, like the slides 79, are secured in position after adjustment, by any suitable devices, such as set screws. Each shaft 83 is provided with a screw-threaded portion 83' (Fig. 7) screwing within a nut 97 which is secured rigidly to the corresponding member of the frame 87. This frame also has at each side an opening 87' into which projects the end of a bracket 98 rigid with the corresponding member of the frame 66, said end having an opening through which the shaft 83 extends, the shaft being adapted to turn in said opening, and said end of the bracket 98 being adapted to slide lengthwise on the shaft 83 as the frame 87 is adjusted toward or from the frame 66 by turning the shafts 83. The upper end of the conveyer 92 passes over a pulley or roller 99 mounted to turn about a horizontal axis 100.

Parallel with the horizontal upper run of the conveyer 59 extends the lower run of a companion conveyer 101 supported by horizontal rollers 102 and 103 which are journaled in a frame consisting of two spaced members 104 connected rigidly by a transverse rod 105 (Figs. 3 and 8). Each of the members 104 is formed with two aligning spaced vertical sleeves 104' in which is mounted to turn a vertical shaft 106, and between said sleeves is secured rigidly to the shaft a sprocket wheel 107, the sprocket wheels of the two shafts 106 being connected by a chain 108 (Fig. 4), so that the two shafts will be compelled to turn in unison in the same direction. One of the shafts 106 carries an operating hand-wheel 109 at its upper end. The lower end of each shaft 106 is screw-threaded, as indicated at 106', and extends loosely through two spaced projections 33' of the housing 33, and also has a threaded engagement with a collar or nut 110 located between said projections and rigid with the housing 33. Thus, when the hand-wheel 109 is rotated, the shafts 106 will screw up or down in the nuts 110, thereby effecting a vertical adjustment of the conveyer 101 carried by the frame 104, 105, see particularly Figs. 1, 2, 3, and 8. To lock the frame 104, 105 after adjustment, one of the shafts 106, or both, may be provided with a locking arm 111 having an internally threaded hub fitted to the threaded portion 106' of the shaft and adapted for clamping engagement with the upper surface of the adjacent projection 33'.

In order to properly drive the several conveyers in the desired directions, irrespective of the adjustments described, and even while the adjustments are being made, we have provided the following mechanism, in the particular embodiment of our invention illustrated herein: The toothed gear 27, rotating with the drum, is in mesh with a pinion 112 (Figs. 3 and 4) supported at the pivotal junction of two arms 114 and 115, of which the arm 114 is loosely supported at the other end on the shaft 22, while the lower end of the arm 115 is loosely supported on the shaft or axle 102' of the roller 102. The shaft 102' carries rigidly a pinion 113 in mesh with the pinion 112 and also carries a sprocket wheel 116 transmitting its motion, by means of a chain 117, to another sprocket wheel 118 on the shaft 100 of the roller 99, thus driving the conveyer 92. The shaft 100 further carries a gear 119 in mesh with a gear 120 on a transverse shaft 121, to which is secured rigidly a sprocket wheel 122, from which a chain 123 transmits motion to another sprocket wheel 124 on the shaft 80, thereby driving the conveyer 59.

In operation, the dough, formed into cylindrical coils or rolls such as indicated at A in Fig. 1, by means well-known in the art and not illustrated herein, is fed automatically at proper intervals to the entrance end of the semi-circular path or space lying between the pressure-plate 28 and the lower half of the feeding drum, the latter rotating continuously to carry such rolls A from the entrance end 28' of the pressure-plate 28 to the other end which overlaps the bridging member 29. The rotation of the drum causes the dough to be rolled in said space, along the inner surface of the pressure-plate. The dough is then delivered to the upper end of the bridging member 29, since the conveyer 101, as clearly shown in Fig. 1, projects into the path of the dough rolls A and prevents their following the drum beyond the bridging member. As the rotation of the drum brings a roll A against the lower run of the conveyer 101, where such lower run extends inwardly beyond the adjacent end of the bridging member 29, this lower run, as it moves outwardly, will feed the dough roll horizontally outward, at first between said lower run and the upper portion of the bridging member 29, and then between said run and the parallel upper run of the conveyer 59, said two runs moving in the same direction, and at the same speed. It will be noted that the upper end of the conveyer 92 projects beyond the upper run of the conveyer 59 and faces the outer end of the horizontal space between the opposing runs of the conveyers 59 and 101, so that the dough portion or roll carried outwardly by said horizontal runs will be brought against the downwardly-moving projecting upper end of the conveyer 92 and deflected thereby into the upright channel or path lying between the opposing runs of the conveyers 59 and 92, both of which runs move downwardly at the same speed, and are held in parallelism by the backing plates 77 and 91. Finally, the dough portions are discharged at the lower end of said upright space or path, into a suitable device for the further conveying and treatment of the dough, for instance into pans 125 attached to a conveyer which brings the dough portions or rolls to an apparatus known as the "final proofer." Obviously, the point of discharge ought to be determined carefully with respect to the nature of the dough, the speed of the conveyers 59 and 92, and the speed of the conveyer carrying the pans 125. To enable the attendant to shift the point of discharge lengthwise of the conveyer carrying the pans 125, in order to secure the proper timing referred to above, we have provided the suspension of the structure consisting of the frames 66 and 87, on the pivot 61, and the manner of effecting this adjustment will be obvious from the detailed description (given above) of the mechanism for swinging said frame 66 on its pivot.

The purpose and operation of the other adjustments will be easily understood. By adjusting the pressure-plate 28 up or down, the space between said plate and the periphery of the feed drum is decreased or increased in width, as may be required in view of the consistency of the dough, or in view of the varying diameter of the rolls of dough A. Similarly, the width of the path between the opposing horizontal runs of the conveyers 59 and 101, and between the opposing upright runs of the conveyers 59 and 92 is adjusted according to the diameter and to the nature or consistency of the dough rolls A. It will be noted that whenever the pressure plate 28 is adjusted up or down, the bridging member 29 is automatically adjusted outwardly or inwardly, so that no gap will be allowed to be formed, and the dough will be guided properly from the pressure-plate 28 over the bridging member 29, to the horizontal upper run of the conveyer 59, in every position of the pressure-plate.

In order that the driving chain 117 may preserve its proper tension notwithstanding the adjustment of the structure consisting of the frames 66 and 87, about its pivot 61, we may provide any suitable device, such as a tension roller or idler 58, (Figs. 1, 3 and 4) pressed against said chain by a spring 58' one end of which is connected with the bearing of said roller, its other end being secured to a stationary part.

The object of having the ends of the arms 34 extend through slots 29' of the bridging member and bear directly against the pressure-plate 28, while only the rod 37 bears against said bridging member, is to reduce the friction between the bridging member and the pressure-plate.

Various modifications may be made without departing from the nature of our invention as set forth in the appended claims.

We claim as our invention:

1. In apparatus for feeding materials, a rotary drum, a pressure-plate located adjacent to a portion of the periphery of said drum and adjustable toward and from the same, a conveyer leading away from the drum at the discharge end of said pressure plate, a bridging member overlapping the supporting portion of said conveyer adjacent to the drum and guided to move toward and from said drum, in a direction parallel to said supporting portion, the discharge end of said pressure-plate being in sliding engagement with said bridging member, and means for effecting the adjustment of said pressure-plate and bridging member.

2. In apparatus for feeding materials, a rotary drum, a pressure-plate located adjacent to a portion of the periphery of said drum and adjustable toward and from the same, a conveyer having a supporting portion leading away from the drum at the discharge end of said pressure-plate, a bridging member overlapping said supporting portion and movable, in a direction parallel thereto, toward and from the drum, said bridging member extending adjacent to said discharge end of the pressure-plate, and means whereby the bridging member will be caused to follow the adjustment of said pressure-plate.

3. In apparatus for feeding materials, a rotary drum, a pressure-plate located adjacent to a portion of the periphery of said drum and adjustable toward and from the same, a conveyer having a supporting portion leading away from the drum at the discharge end of said pressure-plate, a bridging member having an upper portion extending over said supporting conveyer portion and a depending portion in sliding engagement with the discharge portion of the pressure-plate on the outer surface thereof, said bridging member being movable in a direction parallel to said supporting conveyer portion, and an actuating device for adjusting the pressure-plate and the bridging member, said actuating device having a portion in direct engagement with the pressure-plate, and another portion in direct engagement with the bridging member.

4. In apparatus for feeding materials, a rotary drum, a pressure-plate located adjacent to a portion of the periphery of said drum and adjustable toward and from the same, a conveyer having a supporting portion leading away from the drum at the discharge end of the pressure-plate, a bridging member having a portion extending away from the drum adjacent to said supporting conveyer portion and a circumferential portion in sliding engagement with the discharge portion of the pressure-plate on the outer surface thereof, and a rock-shaft for adjusting said pressure-plate and the bridging member, said rock-shaft having two arms in direct engagement with the pressure-plate and a rod connecting said arms and in direct engagement with said bridging member.

5. In apparatus for feeding materials, two conveyers having parallel runs to feed the material, a rotary drum for supplying the material to one end of said parallel runs, a pressure-plate located adjacent to a portion of the periphery of said drum and terminating adjacent to said end of said parallel runs, and another conveying means, extending at an angle to said runs and across the outlet between the other ends of said runs, to receive the material from said runs and carry it away to one side.

6. In apparatus for feeding materials, two conveyers having parallel runs to feed the material between them, a rotary drum for supplying the material at one end of said runs, a pressure-plate located adjacent to a portion of the periphery of said drum and terminating adjacent to said end of said parallel runs, and another conveying means, extending transversely of said runs at a distance in advance of their discharge ends, and having a portion facing directly the space between said conveyer runs at the discharge end thereof.

7. In apparatus for feeding materials, two conveyers having parallel runs to feed the material between them, a rotary drum for supplying the material at one end of said runs, a pressure-plate located adjacent to a portion of the periphery of said drum and terminating adjacent to said end of said parallel runs, another conveying means for carrying away laterally, the material delivered by said conveyer runs, and means for adjusting said conveying means to different angles relatively to said conveyer runs.

8. In apparatus for feeding materials, a conveyer having a supporting run, a rotary drum for feeding the material to one end of said run, a pressure-plate located adjacent to a portion of the periphery of said drum and terminating adjacent to said end of said run, another conveying means located in front of the other end of said run and in the path of the material fed thereby, and means for adjusting said conveying means to different angles relatively to said supporting conveyer run.

9. In apparatus for feeding materials, a conveyer having a supporting run, a rotary drum for supplying material to said run at one end, a pressure-plate located adjacent to a portion of the periphery of said drum and terminating adjacent to said end of said run, and another conveying means extending across the path of the material in front of the other end of said run, said conveying means being mounted to swing about a horizontal axis transverse to the direction of travel of said run, to vary the angle which the path of said conveying means forms with the path of said conveyer run.

10. In apparatus for feeding materials, a conveyer having a supporting run and a depending run at one end of said supporting run, a rotary drum for supplying the material to the other end of said supporting run, a pressure-plate located adjacent to a portion of the periphery of said drum and terminating adjacent to said other end of said supporting run, and another conveying means extending parallel to said depending run and projecting above the upper end thereof so as to be in the path of the material fed by said supporting run.

11. In apparatus for feeding materials, a conveyer having a supporting run and a depending run at one end of said supporting run, a rotary drum for supplying the material to the other end of said supporting run, a pressure-plate located adjacent to a portion of the periphery of said drum and terminating adjacent to said other end of said supporting run, another conveying means extending parallel to said depending run and projecting above the upper end thereof so as to be in the path of the material fed by said supporting run, and a carrier common to said depending run and to said conveying means, said carrier being adjustable to vary the angle which the path of said depending run and of said conveying means forms with the path of said supporting conveyer run.

12. In apparatus for feeding materials, a conveyer having a supporting run and rollers at the ends thereof, and a depending run extending from one of said rollers, a rotary drum for supplying the material to said run adjacent to the other roller, a pressure-plate located adjacent to a portion of the periphery of said drum and terminating adjacent to such other roller, and a swinging carrier for said depending run, said carrier being mounted to swing about the axis of the roller located at the junction of the depending run with the supporting run.

13. In apparatus for feeding materials, a conveyer having a supporting run and a depending run at one end of said supporting run, a rotary drum for supplying the material to the other end of said supporting run, a pressure-plate located adjacent to a portion of the periphery of said drum and terminating adjacent to said other end of said supporting run, another conveying means extending parallel to said depending run and projecting above the upper end thereof so as to be in the path of the material fed by said supporting run, and a carrier common to said depending run and to said conveying means, said carrier being mounted to turn about an axis transverse to the path of the material and located at the junction of said supporting run with said depending run.

14. In apparatus for feeding materials, a conveyer having a supporting run and a depending run at one end of said supporting run, a rotary drum for supplying the material to the other end of said supporting run, a pressure-plate located adjacent to a portion of the periphery of said drum and terminating adjacent to said other end of said supporting run, a parallel companion conveyer run above said supporting run, means for varying the distance between said parallel conveyer runs, a carrier on which said depending run is mounted, said carrier being adjustable to vary the angle which the path of said depending run forms with the path of said supporting run, another conveying means, mounted on said carrier and extending parallel to the said depending run and projecting above the upper end thereof so as to be in the path of the material fed by said supporting run, and means for varying the distance between said depending run and the co-operating conveying means.

15. In apparatus for feeding materials, a conveyer having a supporting run and a depending run at one end of said supporting run, a rotary drum for supplying the material to the other end of said supporting run, a pressure-plate located adjacent to a portion of the periphery of said drum and terminating adjacent to said other end of said supporting run, driving mechanism for said conveyer, a carrier on which said depending run is mounted, said carrier being adjustable to vary the angle which the path of said depending run forms with the path of the supporting run, another conveying means mounted on said carrier and having an operative run parallel to said depending run and projecting above the upper end of said run so as to be in the path of the material fed by the supporting run, flexible driving means connecting said conveying means with said driving mechanism, and tension means for maintaining said flexible means in proper driving condition during the adjustment of the carrier.

16. In apparatus for feeding materials, a rotary drum for conveying material and a driving gear held to rotate with said drum, a conveyer having a supporting run adapted to receive material from said drum, a pressure-plate located adjacent to a portion of the periphery of said drum and terminating adjacent to the receiving end of said run, another conveying means located in front of the discharge end of said supporting run and in the path of the material delivered thereby, means for swinging said conveying means about an axis parallel to that of the drum, a driven gear in operative connection with said conveying means, and held to share said swinging movement, and an intermediate gear engaging both of said first-named gears and adjustably supported to remain in mesh with both of them during the adjustment of the conveying means.

17. In apparatus for feeding materials, a conveyer having a supporting run and a depending run connected with one end of said supporting run, a rotary drum for feeding the material to the other end of said supporting run, a pressure-plate located adjacent to a portion of the periphery of said drum and terminating adjacent to said other end of said supporting run, another conveying means having a run in the path of the material fed by said supporting run and parallel to said depending run, and plates for backing the conveyer and conveying means at the said runs.

In testimony whereof we have signed this specification.

ROBERT ELMER BAKER.
LAURENCE SEYMOUR HARBER.